United States Patent [19]

Chao et al.

[11] Patent Number: 5,174,979

[45] Date of Patent: Dec. 29, 1992

[54] MIXED ION-EXCHANGED ZEOLITES AND PROCESSES FOR THE USE THEREOF IN GAS SEPARATIONS

[75] Inventors: Chien C. Chao, Millwood; John D. Sherman, Chappaqua; Joseph T. Mullhaupt, Williamsville, all of N.Y.; Cornelius M. Bolinger, Sugarland, Tex.

[73] Assignee: UOP, Des Plaines, Ill.

[21] Appl. No.: 418,428

[22] Filed: Oct. 6, 1989

[51] Int. Cl.⁵ .................... C01B 33/34; B01D 53/04
[52] U.S. Cl. .................................. 423/715; 502/64; 502/79; 55/58; 55/68; 55/75
[58] Field of Search .............. 55/58, 68, 75; 423/328, 423/329, 330; 502/79, 64, 400, 407, 408, 411, 414, 416

[56] References Cited

U.S. PATENT DOCUMENTS

| | | | |
|---|---|---|---|
| 2,882,244 | 4/1959 | Milton | 423/328 |
| 3,140,932 | 7/1964 | McKee | 55/68 |
| 3,282,028 | 11/1966 | Berlin | 55/75 |
| 4,544,378 | 10/1985 | Coe et al. | 55/68 |
| 4,557,736 | 12/1985 | Sircar et al. | 55/68 |
| 4,756,723 | 7/1988 | Sircar | 55/68 |
| 4,765,808 | 8/1988 | Oigu et al. | 55/68 |
| 4,859,217 | 8/1989 | Chao | 55/75 |

OTHER PUBLICATIONS

Schollner et al.; "Arrangement and Mobility of $Li^{+-}$-Ions in A-Zeolite and the Influence of Mono-and Divalent Cations and Adsorbed Molecules on It", from *Molecular Sieves II*, ACS Symposium Series, R. F. Gould ed., 1977, pp. 357-366.

*Primary Examiner*—R. Bruce Breneman
*Attorney, Agent, or Firm*—Thomas K. McBride; Richard G. Miller

[57] ABSTRACT

Lithium/alkaline earth metal X zeolites in which the lithium:alkaline earth metal equivalent ratio is from about 95:5 to about 50:50 and lithium/alkaline earth metal A zeolites in which the lithium:alkaline earth metal equivalent ratio is from about 10:90 to about 70:30 are useful for separating oxygen and nitrogen from mixtures because they combine high adsorption capacity with high thermal stability.

22 Claims, 10 Drawing Sheets

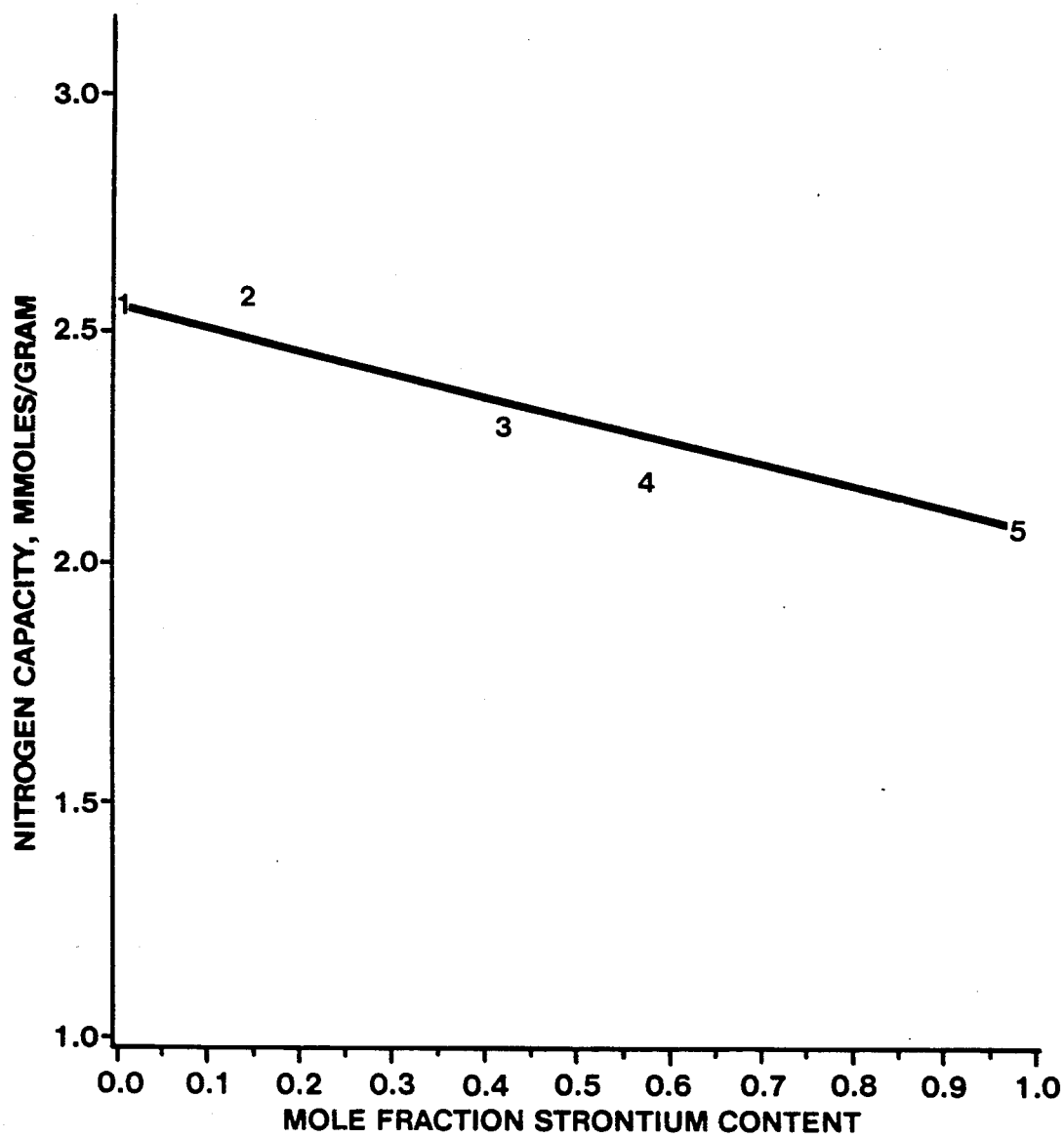

MIXED ION-EXCHANGED ZEOLITES AND PROCESSES FOR THE USE THEREOF IN GAS SEPARATIONS

FIELD OF THE INVENTION

This invention relates to lithium/alkaline earth metal zeolites and processes for the use thereof in gas separations. More specifically, this invention relates to lithium/alkaline earth metal X and A zeolites containing specific molar ratios of lithium to alkaline earth metal, and to the use of these materials in separating nitrogen and oxygen from mixtures thereof, especially air, by pressure swing adsorption (PSA) processes.

BACKGROUND OF THE INVENTION

The separation of mixtures of gases, especially air, by so-called pressure swing adsorption processes is well-known to those skilled in gas separation technology. In principle, a PSA process involves the following steps:

(a) contacting a gaseous feed mixture of two or more different gases with an adsorbent under a first, relatively high, pressure, thereby causing at least one of the gases to be selectively adsorbed into the adsorbent, and producing a gaseous first product mixture containing a greater proportion of the less selectively adsorbed gas or gases than the feed mixture;

(b) separating the first product mixture from the adsorbent; and (c) reducing the pressure on the adsorbent to a second pressure lower than the first pressure, thereby causing desorption from the adsorbent sieve of a gaseous second product mixture containing a greater proportion of the selectively adsorbed gas(es) than the feed mixture.

In industrial practice, PSA processes tend to be considerably more complicated than this simple description would suggest, and usually involve several adsorption vessels (usually referred to as "beds"). For example, U.S. Pat. No. 3,430,418 to Wagner and U.S. Pat. No. 3,986,849 to Fuderer et al. describe PSA processes using multi-bed systems. Such cycles are commonly based on the release of void space gas from the product end of each bed in one or more cocurrent depressurization steps upon completion of the adsorption step. In these cycles, a portion of the released gas typically is employed for pressure equalization and for subsequent purge steps. The bed is thereafter countercurrently depressurized and/or purged to desorb the more selectively adsorbed component of the gas mixture from the adsorbent and to remove such gas from the feed end of the bed prior to the repressurization thereof to the adsorption pressure.

U.S. Pat. No. 3,738,087 to McCombs describes a three-bed system for the separation and recovery of air and other gases. In one process described in this patent, air is added to an adsorbent bed for the repressurization of that bed. Nitrogen is then selectively adsorbed and oxygen is discharged from the product end of the bed at rates such that the bed pressure increases to the upper adsorption pressure. A PSA cycle incorporating the increasing pressure adsorption step includes (1) the increasing pressure adsorption step; (2) cocurrent depressurization to an intermediate pressure with release of void space gas from the product end thereof; (3) countercurrent depressurization to a lower desorption pressure; (4) purge; and (5) partial repressurization. The void space gas released during the cocurrent repressurization step is employed in this process for (1) passage to other beds in the system in a pressure equalization step; (2) providing purge gas; (3) providing a pressure equalization sequence; and (4) to produce the product. The PSA cycle incorporating the increasing pressure obviates the constant pressure adsorption step employed in the Wagner cycle. Additionally, more time for bed regeneration is available during the steps of countercurrent depressurization and purge within a given cycle time. Greater productivity and recovery and/or purity are obtained with this improvement to a given system. This is particularly true in systems designed for relatively short overall cycle time operation.

U.S. Pat. No. 4,589,888 to Hiscock et al. describes a reduced cycle time, four-bed process. The gas released upon cocurrent depressurization from higher adsorption pressure is employed simultaneously for pressure equalization and purge purposes. Cocurrent depressurization is also performed at an intermediate pressure level, while countercurrent depressurization is simultaneously performed at the opposite end of the bed being depressurized.

A PSA process suitable for the recovery of both less and more readily adsorbable components is described in British Patent 1,536,995 to Benkmann. This process involves two beds in a series cycle. The feed is introduced into the lower bed which retains the more readily adsorbable component. The feed step is followed by a copurge step in which the less readily adsorbable or "light" component is displaced in the lower bed by a recycled stream of "heavy" components, so that the lower bed at the end of the step contains only the heavy component. At this moment, the connection between the upper and lower beds is interrupted by an automatic valve and the heavy product is recovered from the lower bed by countercurrent depressurization. The upper bed is, in the meantime, also depressurized and purged to remove all the heavy components.

It is also known to use permeable membranes in conjunction with PSA systems. U.S. Pat. No. 4,398,926 to Doshi describes a PSA system in which a feed gas stream is passed over a permeable membrane to achieve bulk separation of impurities from the high pressure feed gas stream, with passage of the product-rich permeate gas to the PSA system at reduced pressure for final purification. To increase product recovery in the PSA system, a portion of the non-permeate gas from the permeable membrane is depressurized to the permeate pressure level, such as the adsorption pressure level, and is passed under pressure to the PSA system as a co-feed gas. The gas is passed to each adsorbent bed of the system in turn prior to commencing cocurrent depressurization.

The terms "pressure swing adsorption process" and "PSA process" as used herein include all the foregoing and similar processes for separating gaseous mixtures.

Whatever the exact details of the apparatus and process steps used in a PSA process, critical factors include the capacity of the adsorbent for the more adsorbable gas, the selectivity of the adsorbent, and the stability of the adsorbent. The selectivity of the adsorbent is normally measured in terms of separation factor (SF) which is defined by:

$$SF_{(x/y)} = (A_x \cdot G_y)/(A_y \cdot G_x)$$

where $A_x$ and $A_6$ are the concentration of adsorbates x and y in the adsorbed phase, and $G_x$ and $G_y$ are the concentrations of x and y in the gaseous phase.

In many PSA processes, zeolites are the preferred adsorbents because of their high adsorption capacity and their high selectivity; both these properties are due to the microporous nature of the zeolite structure, in which a large number of pores of a consistent size extend throughout the lattice framework and bare cations occupy well defined and consistent positions in the pores. For example, U.S. Pat. No. 2,882,243 to Milton describes the use of zeolite A having a silica/alumina ratio of 1.85±0.5 and containing hydrogen, ammonium, alkali metal, alkaline earth metal or transition metal cations as an adsorbent for separating nitrogen and oxygen. U.S. Pat. No. 2,882,244 also to Milton describes a similar process but in which X is a different type of zeolite having a silica/alumina ratio of 2.5±0.5.

U.S. Pat. No. 4,453,952 to Izumi describes the use of sodium zeolite A containing iron (II), and optionally potassium, as an adsorbent for separating nitrogen and oxygen.

European Patent Application No. 84730031.6 (Publication No. 122 874) describes the use of sodium faujasite as an adsorbent for separating nitrogen and oxygen.

U.S. Pat. Nos. 3,140,932 and 3,140,933, both to McKee, describe the use of X zeolites which have been ion-exchanged with alkali metal or alkaline earth metals as adsorbents for separating nitrogen and oxygen. Since the ion-exchange was not exhaustive and the X zeolites were synthesized using sodium as the templating agent, the partially ion-exchanged materials used are in fact mixed sodium/alkali metal or /alkaline earth metal zeolites.

Among all the molecules which can be adsorbed by A and X zeolites, water has the highest affinity. In order to secure optimum adsorption performance it is necessary to activate the zeolite by heating it to high temperatures in order to drive off as much adsorbed water as possible; adsorbed water, even in small amounts, seriously diminishes the adsorption capacity of the zeolite. A portion of the adsorbed water in zeolites is held tenaciously, and typically, in industrial plants, the zeolite must be heated to 600° to 700° C. to drive off most of this tenaciously-held water. Unfortunately, some zeolites which have desirable adsorption properties are not stable to the high temperatures required to drive off this water. In particular, lithium A and X zeolites have a high adsorption capacity for nitrogen and good selectivity in nitrogen/oxygen separations, and may be used with good results in nitrogen/oxygen separations under industrial conditions; the use of lithium X zeolites in such separations is described and claimed in U.S. patent application Ser. No. 067,820, filed June 30, 1987 now U.S. Pat. No. 4,859,217. The thermal stability of lithium A and X zeolites is sufficient to permit their activation provided that the activation temperature is carefully controlled. However, under industrial conditions, where it may be necessary to activate several tons of adsorbent at one time, it is difficult and expensive to achieve precise control and uniformity of the activation temperature throughout the large mass of adsorbent being activated, so that it is desirable to use an adsorbent with a wide margin of safety between the temperature necessary for activation and the temperature at which damage to the crystal structure of the adsorbent occurs rapidly. In the case of lithium A and X zeolites, the margin of safety is somewhat less than is desirable for use under industrial conditions; for example, a lithium X zeolite may suffer rapid crystal collapse at approximately 740° C., a temperature which does not leave a very wide safety margin if activation at 650°-700° C. is required.

It has now been discovered that lithium/alkaline earth metal A and X zeolites in which the lithium/alkaline earth metal molar ratios fall within certain ranges have thermal stabilities greater than the corresponding pure lithium zeolites and adsorption capacities and selectivities which are almost as good as those of the corresponding pure lithium zeolites. Accordingly, these lithium/alkaline earth metal A and X zeolites are useful in separating nitrogen and oxygen.

SUMMARY OF THE INVENTION

This invention provides a lithium/alkaline earth metal X zeolite in which the lithium:alkaline earth metal equivalent ratio is from about 95:5 to about 50:50 and a lithium/alkaline earth metal A zeolite in which the lithium:alkaline earth metal equivalent ratio is from about 10:90 to about 70:30.

This invention also provides a process for preparing such a lithium/alkaline earth metal zeolite, which process comprises:

ion-exchanging an A or X zeolite, in a form having alkali metal cations other than lithium, with a solution of a lithium salt until at least about 90 mole percent of the original alkali metal cations have been replaced by lithium cations; and thereafter, ion-exchanging the lithium A or X zeolite thus produced with a solution of an alkaline earth metal salt until a sufficient proportion of the lithium cations have been replaced with alkaline earth metal cations to provide a lithium/alkaline earth metal equivalent ratio within the specified range.

Finally, this invention provides a PSA process for separating nitrogen from oxygen, which process comprises:

contacting a gaseous feed mixture of nitrogen and oxygen with a molecular sieve under a first pressure, thereby causing nitrogen to be selectively adsorbed into the molecular sieve, and producing a gaseous first product mixture containing a greater proportion of oxygen than the feed mixture;

separating the first product mixture from the molecular sieve; and reducing the pressure on the molecular sieve to a second pressure lower than the first pressure, thereby causing desorption from the molecular sieve of a gaseous second product mixture containing a greater proportion of nitrogen than the feed mixture, in which the molecular sieve comprises a lithium/alkaline earth metal zeolite selected from the group consisting of X zeolites in which the lithium:alkaline earth metal equivalent ratio is from about 95:5 to about 50:50 and A zeolites in which the lithium:alkaline earth metal equivalent ratio is from about 10:90 to about 70:30.

BRIEF DESCRIPTION OF THE DRAWINGS

FIG. 10 shows the variation of the nitrogen adsorption capacity of mixed lithium/strontium zeolites with mole fraction of strontium, as determined in the experiments described in Example 4 below.

DETAILED DESCRIPTION OF THE INVENTION

Figure 1:
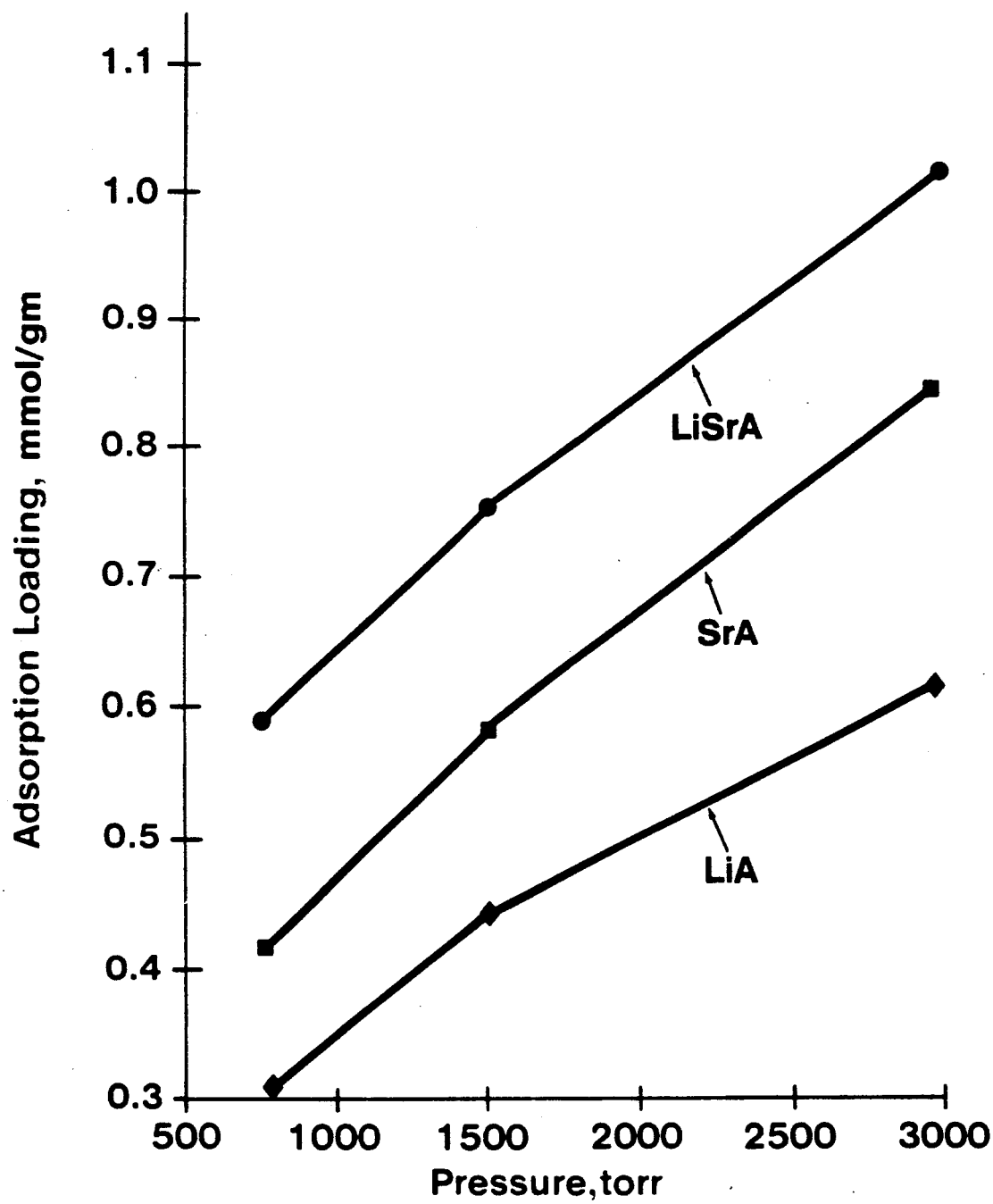
FIG. 1 shows the nitrogen isotherms obtained in the experiments described in Example 1 below.

As already mentioned, this invention provides lithium/alkaline earth metal X zeolites in which the lithium:alkaline earth metal equivalent ratio is from about 95:5 to about 50:50, and lithium/alkaline earth metal A zeolites in which the lithium:alkaline earth metal equivalent ratio is from about 10:90 to about 70:30. The preferred X zeolites of the invention are those in which the lithium:alkaline earth metal equivalent ratio is from about 85:15 to about 70:30. The preferred A zeolites of the invention are those in which the lithium:alkaline earth metal equivalent ratio is from about 20:80 to about 50:50. In both cases, the preferred alkaline earth metals are magnesium, calcium and strontium.

It has been found that, in lithium/alkaline earth metal zeolites, the thermal stability of the zeolite increases rapidly and approximately linearly with increasing alkaline earth metal content, while the adsorption capacity for nitrogen tends to decrease slowly and approximately linearly with increasing alkaline earth metal content. For example, in the lithium/calcium X zeolites, the thermal stability (as measured by the first peak in the DTA test) increases from 744° C. at 0% calcium (i.e., a pure lithium X zeolite) to 968° C. at 100% calcium. Similarly, in the lithium/strontium X zeolites, the thermal stability increases from 744° C. at 0% strontium (i.e., a pure lithium X zeolite) to 946° C. at 100% strontium. Also, in the lithium/calcium X zeolites, the adsorption capacity (as measured by the quantity of nitrogen adsorbed per unit weight of zeolite at 23° C. and 5 atmospheres pressure under a pure nitrogen atmosphere) decreases from 2.55 mmoles/g. at 0% calcium to 2.05 mmoles/g. at 100% calcium. Similarly, in the lithium/strontium X zeolites, the adsorption capacity decreases from 2.55 mmoles/g. at 0% strontium to 2.08 mmoles/g. at 100% strontium. Similar thermal stability trends are expected as the relative proportions of lithium and alkaline earth metals are varied in A zeolites. However the adsorption capacity and selectivity for nitrogen in A zeolites is less predictable.

By using a lithium/alkaline earth metal zeolite in which the proportions of the two metals are within the ranges specified for the zeolites of the present invention, one can obtain a combination of high thermal stability and high adsorption capacity which renders them these zeolites very suitable for use in PSA processes for the separation of nitrogen and oxygen. At a lithium/alkaline earth metal ratio of about 80:20, the X zeolites of the present invention have a thermal stability of about 790° C., which provides an ample margin of safety over the temperature required for activation of the zeolite, while still retaining better than 95% of the nitrogen adsorption capacity of lithium X zeolite. In the case of the A zeolites, the lower thermal stability of the pure lithium A zeolite should be compensated for by use of a higher proportion of alkaline earth metal, and it has been found that optimum results are usually obtained with a material in which the lithium/alkaline earth metal ratio is approximately 30:70; such a material possesses adequate thermal stability and for reasons not yet understood also displays unexpectedly high nitrogen adsorption capacity and selectivity.

(The DTA test (which will be familiar to those skilled in zeolite technology, and which is described in detail in T. C. Daniels, Thermal Analysis, Wiley, N.Y. (1973), pages 73-13) is used to measure stability of zeolites; all DTA tests referred to herein were taken at a temperature increase of 20° C./minute. It should be noted that, although the thermal stabilities of zeolites as measured by the DTA test results do correlate well with their thermal stabilities as measured by their abilities to survive activation at various temperatures without significant crystal damage, the maximum temperature to which a zeolite may safely be exposed during activation is not equal to the thermal stability temperature as measured by the DTA test. Because of the relatively rapid temperature increase during the DTA test, the test specimen is only exposed to high temperatures for a short time, whereas during activation the zeolite is typically exposed to the activation temperature for a considerably longer period.)

In addition, in some cases it has been found that, at around a lithium/alkaline earth metal equivalent ratio of 25:75, the adsorption capacity of the lithium/alkaline earth metal A zeolites shows an unexpected increase and becomes greater than that of the corresponding lithium zeolite and that of the corresponding alkaline earth metal zeolite.

The preferred method of preparing the zeolites of the present invention is to ion-exchange an as-synthesized A or X zeolite with a solution of a lithium salt until no further lithium can be introduced into the zeolite, and then to ion-exchange the lithium A or X zeolite thus produced with a solution of the appropriate alkaline earth metal until the desired lithium/alkaline earth metal equivalent ratio is achieved. Techniques for the ion-exchange of zeolites are well-known to those skilled in this art, and hence will not be described in detail herein. In both the lithium and alkaline earth metal ion exchanges, the metals are conveniently present in the solutions in the form of their chlorides. Although in theory the two ion-exchange steps could be performed in the reverse order (i.e., an alkaline earth metal ion-exchange followed by a lithium ion-exchange), such a procedure is explicitly not recommended. It has been found that A and X zeolites bind alkaline earth metals much more tightly than lithium. Consequently, if one performs the lithium ion-exchange first and then the alkaline earth metal ion-exchange, it is easy to control the lithium/alkaline earth metal in the final product, since the alkaline earth metal in the ion-exchange solution enters substantially quantitatively into the product. On the other hand, if the alkaline earth metal ion-exchange is performed first, a very large excess of lithium is required in the lithium ion-exchange in order to introduce substantial amount of lithium into the final product (which may lead to difficulties in process conditions and high costs for lithium salt and for disposal of the used lithium ion-exchange solution). Also, it will be difficult to produce precisely the lithium/alkaline earth metal ratio desired in the product.

As is well-known to those skilled in zeolite technology, both A and X zeolites are normally synthesized using sodium as the templating agent, so that the as-synthesized zeolite is in its sodium form (if a organic templating agent is used to synthesize the zeolite, the organic templating agent can be removed by calcination). It has been found that, even after the most exhaustive ion-exchange, a small proportion of the sodium cations in the as-synthesized zeolite can not be replaced by lithium cations, so that, strictly speaking, the lithium-/alkaline earth metal zeolites of the present invention are actually sodium/lithium/alkaline earth metal zeolites in which the molar proportion of sodium is relatively low. Normally, the presence of this small molar proportion of sodium does not interfere with the use of the zeolites in the process of the present invention, but the residual sodium content should not be too large, since an excessive proportion of sodium may reduce the performance of the zeolite in the process of the present invention. It is preferred that the molar proportion of sodium in the zeolites of the present invention not exceed about 5 equivalent percent (based upon the total equivalents of sodium, lithium and alkaline earth metal in the zeolite), although slightly higher sodium contents may be tolerable in some cases.

It has been found advantageous to submit the zeolites of the present invention to treatment with an alkali metal hydroxide before the alkaline earth metal ion-exchange. The hydroxide treatment is typically conducted by slurrying the zeolite in a 2-3% aqueous solution of the appropriate hydroxide at a temperature of about 90°-100° C. for a period of from two to six hours. It has been found that the hydroxide treatment reduces the proportion of amorphous material in the product, apparently by converting amorphous material back to a molecular sieve form, and thereby increases the adsorption capacity of the zeolite.

The zeolites of the present invention can have a variety of physical forms, and the exact physical form of the product may affect its utility in PSA processes. When the zeolites of the present invention are to be used in industrial adsorbers, it may be preferred to aggregate (e.g. pelletize) the zeolite to control the macropore diffusion, or else in an industrial size adsorption column pulverulent zeolite may compact, thereby blocking, or at least significantly reducing flow through, the column. Those skilled in molecular sieve technology are aware of conventional techniques for aggregating molecular sieves; such techniques usually involve mixing the molecular sieve with a binder, which is typically a clay, forming the mixture into an aggregate, typically by extrusion or bead formation, and heating the formed molecular sieve/binder mixture to a temperature of about 600°-700° C. to convert the green aggregate into one which is resistant to crushing.

The binders used to aggregate the zeolites may include clays, silicas, aluminas, metal oxides and mixtures thereof. In addition, the zeolites may be formed with materials such as silica, alumina, silica-alumina, silica-magnesia, silica-zirconia, silica-thoria, silica-berylia, and silica-titania, as well as ternary compositions, such as silica-alumina-thoria, silica-alumina-zirconia and clays present as binders. The relative proportions of the above materials and the zeolites may vary widely with the zeolite content ranging between about 1 and about 99 percent by weight of the composite. Where the zeolite is to be formed into aggregates prior to use, such aggregates are desirably about 1 to about 4 mm. in diameter.

Aggregation may be effected before or after the lithium and alkaline earth metal ion-exchanges required to produce the zeolites of the present invention, i.e., one can first produce the lithium/alkaline earth metal zeolite and then effect aggregation, or one can use as the starting material for the ion-exchanges an A or X zeolite which is already in aggregate form. In general, the latter is preferred, since sodium A and X zeolites are more thermally stable than the lithium/alkaline earth metal zeolites of the present invention and hence less susceptible to damage from the high temperatures used in the aggregation process. However, it should be noted that activation of the lithium/alkaline earth metal zeolite is required even if the sodium zeolite used as starting material has been activated during the aggregation process.

The zeolites of the present invention can be used in any of the conventional types of PSA processes, and the conditions used in the processes of the invention will in general be the same as those used in prior art PSA processes. Thus, in the separation process of the present invention, the first, adsorption pressure will typically be in the range of from about 1 to about 10 atmospheres, while the second, desorption pressure will typically be in the range of from 0 to about 2 atmospheres. The temperature at which the process is conducted is limited only by the decline in adsorption capacity with increasing temperature which the present zeolites share with all other zeolite adsorbents. Typically, the process will be conducted at a temperature in the range of about $-15°$ to about $+60°$ C.

The following Examples are given, though by way of illustration only, to show preferred zeolites of the present invention, and processes for their preparation.

EXAMPLES

Example 1: Lithium/strontium A zeolite

Sodium A zeolite, in the form of $8 \times 12$ U.S. mesh clay-bonded beads having a clay content of 20%, was placed in a glass column. To effect lithium ion-exchange, a 1.5M lithium chloride solution containing 8 moles of lithium per mole of sodium in the zeolite was used. The solution was heated to 90° C. and pumped slowly through the zeolite column for 16 hours. The zeolite was then washed by pumping a large volume of cold water through the column, after which the zeolite was air dried at room temperature.

A sample of lithium A zeolite produced by a similar procedure was packed in a column and subjected to a strontium ion-exchange using the same set-up as the earlier lithium ion-exchange except that the exchange solution was a 0.088 M strontium chloride solution containing a quantity of strontium equivalent to 80% of the total ion-exchange capacity of the LiA zeolite. The ion exchange was carried out by recycling the solution through the column. After the strontium ion-exchange, the zeolite was washed and dried in the same way as before. The resultant LiSrA zeolite had a lithium:strontium equivalent ratio of 25:75.

To provide a control, strontium A zeolite was prepared by ion-exchanging the sodium A starting material with a 0.5M strontium chloride solution containing a quantity of strontium equal to 3 times the total ion-exchange capacity of the sodium A zeolite. This strontium ion-exchange was effected using the same technique as the lithium ion-exchange described above. After the ion-exchange, the resultant SrA zeolite was washed and dried in the same manner as previously described. The results of chemical analysis of the three materials thus produced are given in Table 1 below.

Figure 2:
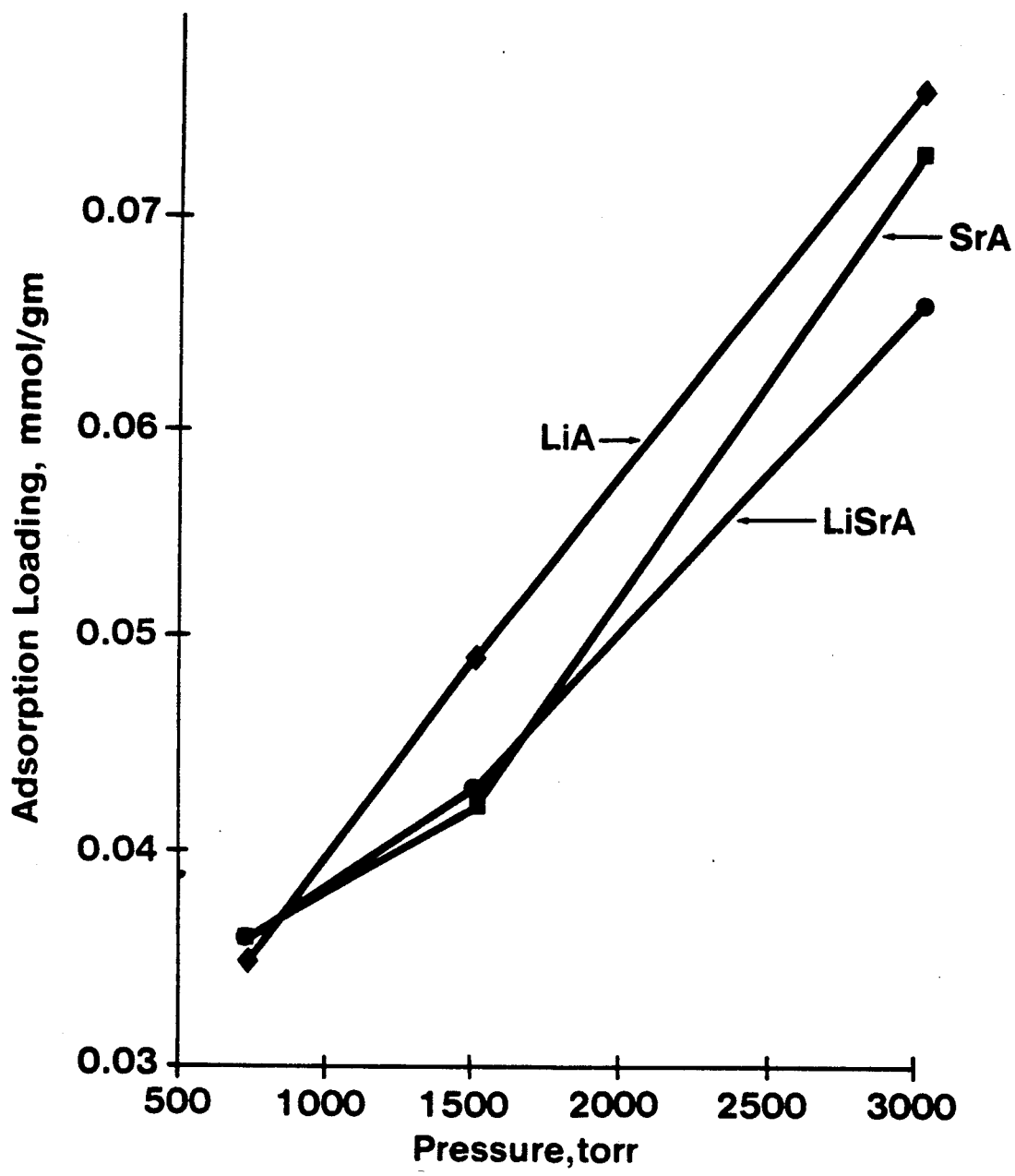
FIG. 2 shows the oxygen isotherms obtained in the experiments described in Example 1 below.
Figure 3:
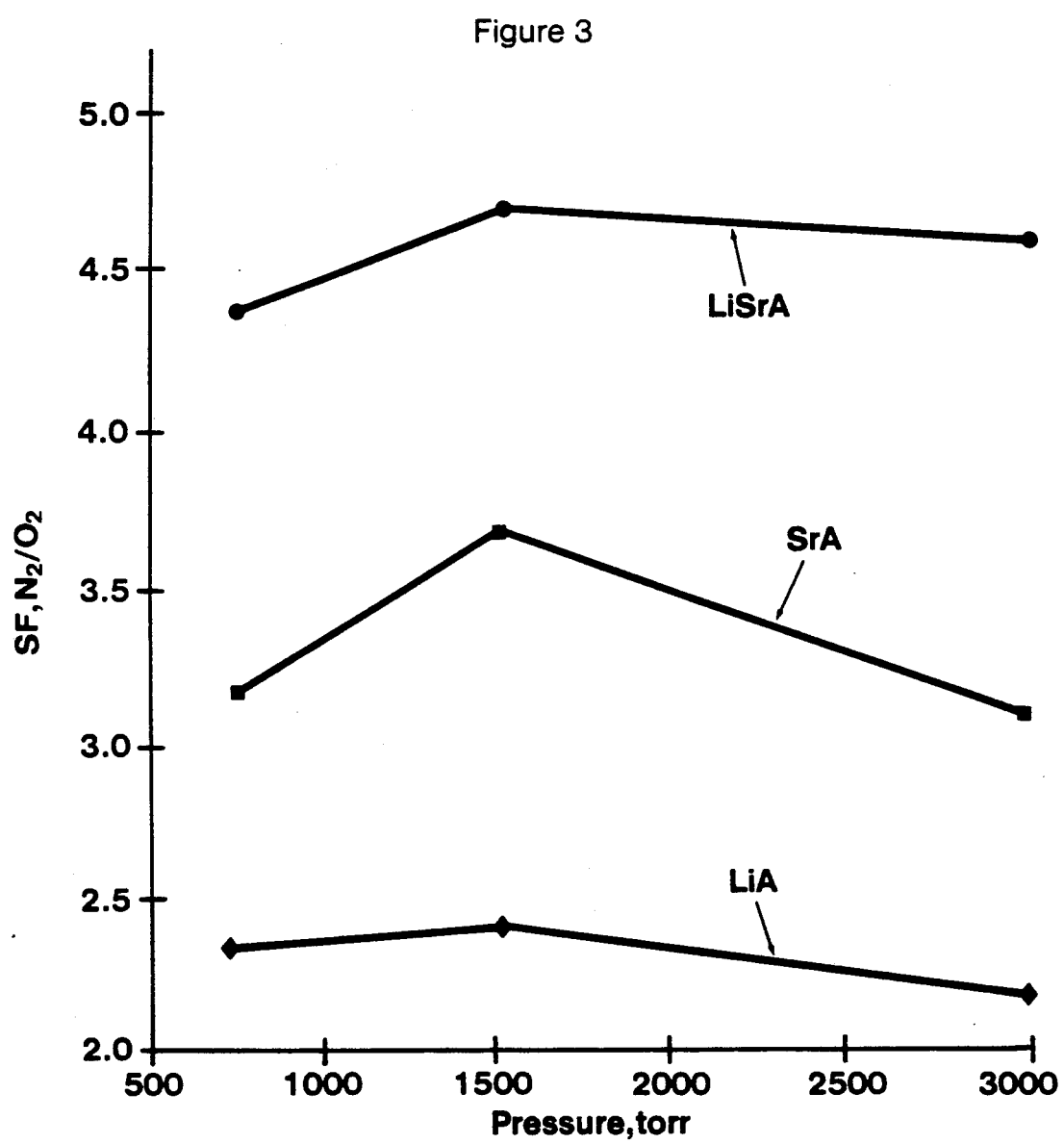
FIG. 3 shows the separation factors obtained in the experiments described in Example 1 below as function of the adsorption pressure.

The LiA, SrA and LiSrA zeolites thus produced were all subjected to binary adsorption measurements. For this purpose, 4 g. of each zeolite was separately activated by heating to 370° C. under vacuum overnight, then packed into 5.2 inch (132 mm.) long, ⅜ inch (9.5 mm.) internal diameter stainless steel column. The adsorption capacity of each zeolite for synthetic air comprising 80% nitrogen and 20% oxygen (v/v) was then measured at 750, 1500 and 3000 Torr. After adsorption equilibrium had been reached, the zeolite was desorbed with a stream of helium gas, and the resulting desorbed gas collected and analyzed by gas chromatography. The resultant nitrogen isotherms are shown in FIG. 1 of the accompanying drawings, the oxygen isotherms in FIG. 2 and the separation factors in FIG. 3. From these Figures it will be seen that the LiSrA zeolite displayed unexpectedly high nitrogen adsorption and separation factors, both being considerably higher than would be expected from the corresponding values for LiA and SrA zeolites. (Since the separation of nitrogen and oxygen by zeolites is a cation specific adsorption, one would logically expect that, for any given zeolite crystal structure, the adsorption selectivity would exclusively depend upon the cation(s) present, so that for a zeolite with mixed cations, the adsorption selectivity would be a weighted average of the values for the corresponding zeolites containing each of the relevant cations. The deviation of the results for LiSrA zeolite is thus contrary to what would be expected by a person skilled in the zeolite art in view of the results for LiA and SrA zeolites.)

Example 2: Lithium/Calcium A Zeolite

Lithium and calcium A zeolites were prepared in the same manner as in Example 1 above, except that calcium chloride solution was used to prepare the calcium A zeolite. Part of the lithium A zeolite thus produced was repacked in the column and subjected to a calcium ion-exchange using the same technique as in the strontium ion-exchange in Example 1, except that the exchange solution was a 0.088M calcium chloride solution containing a quantity of calcium equivalent to 80% of the total ion-exchange capacity of the LiA zeolite. After the calcium ion-exchange, the zeolite was washed and dried in the same way as in Example 1. The results of chemical analysis of the material thus produced are given in Table 1 below.

Figure 4:
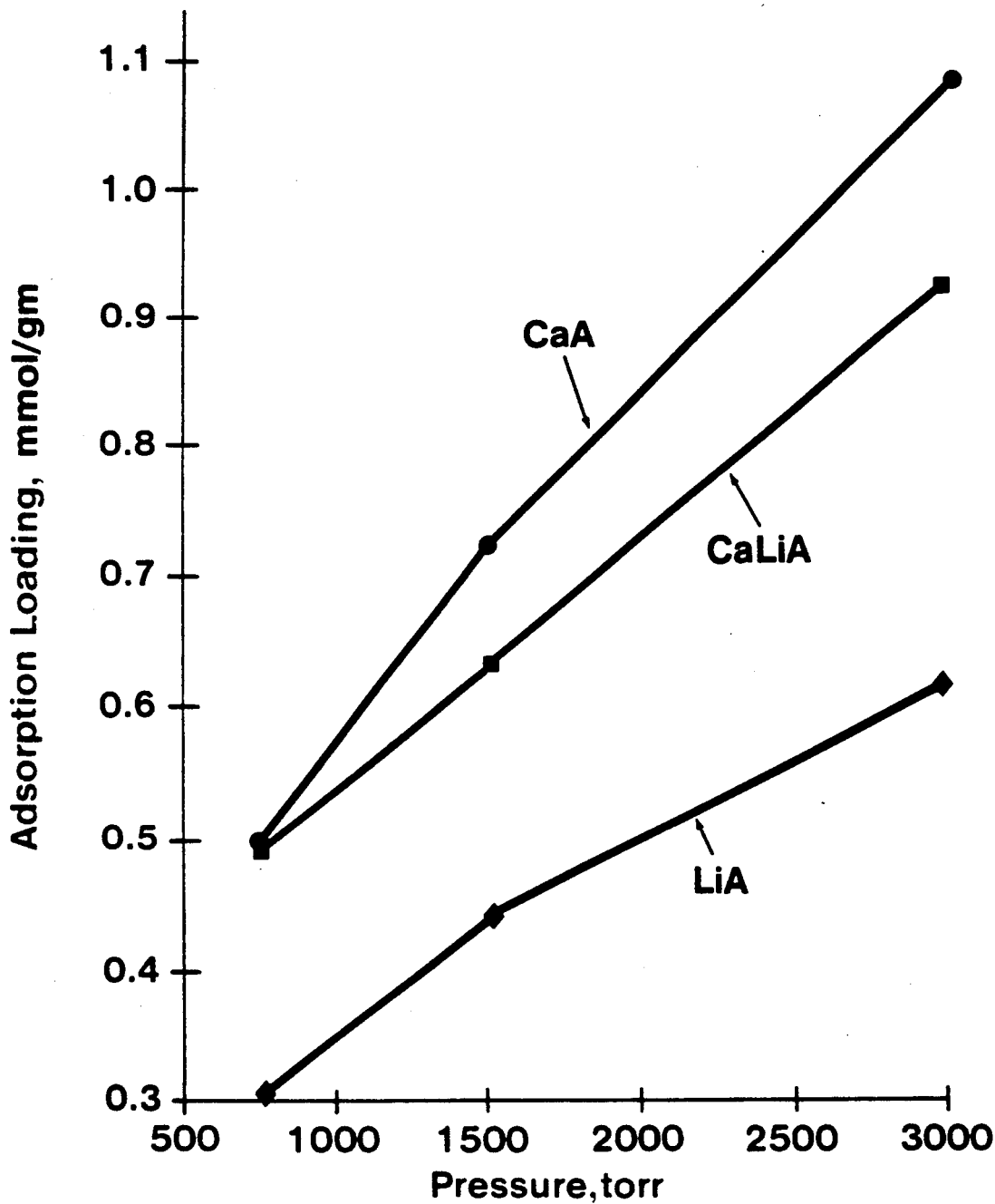
FIG. 4 shows the nitrogen isotherms obtained in the experiments described in Example 2 below.
Figure 5:
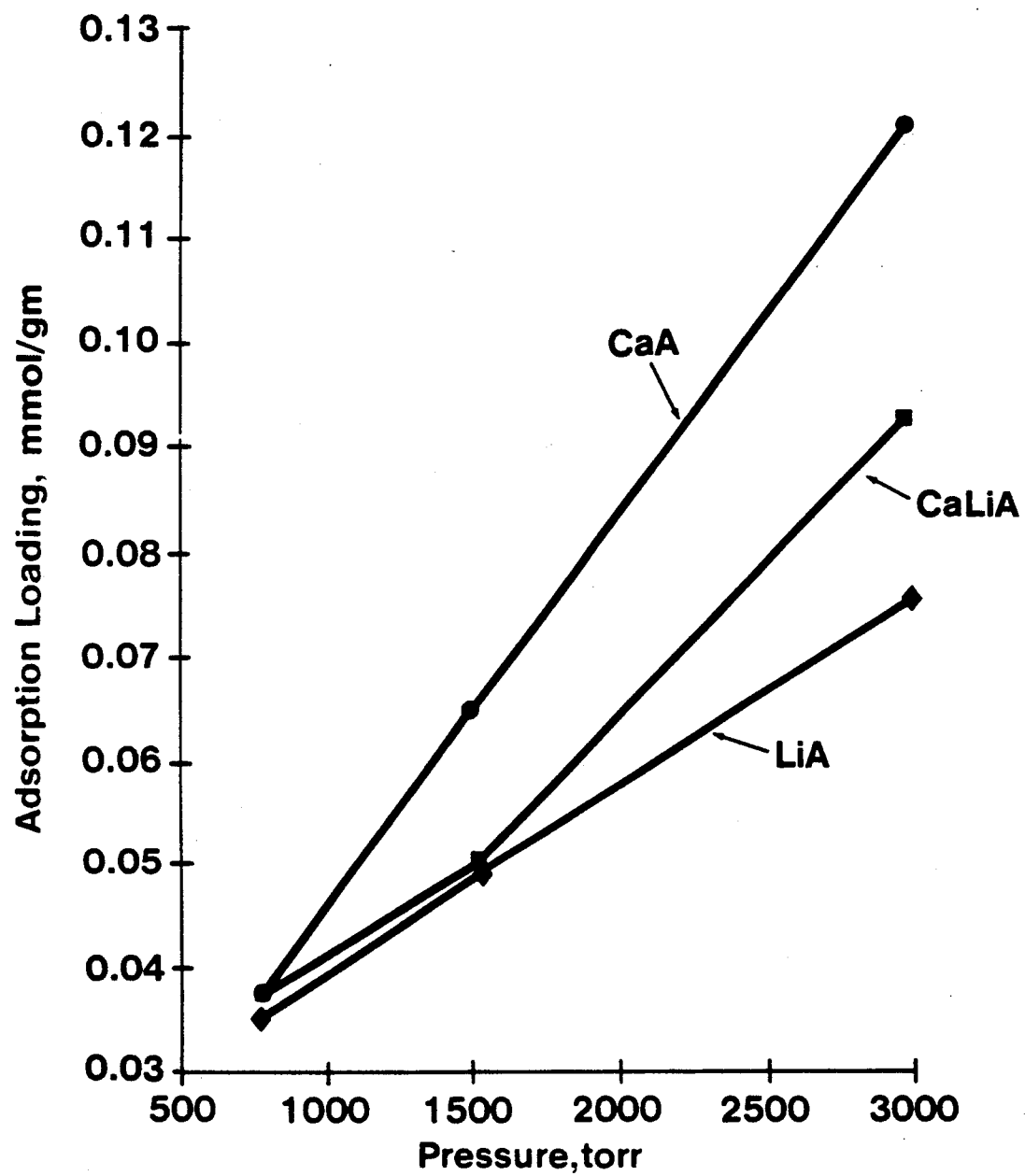
FIG. 5 shows the oxygen isotherms obtained in the experiments described in Example 2 below.
Figure 6:
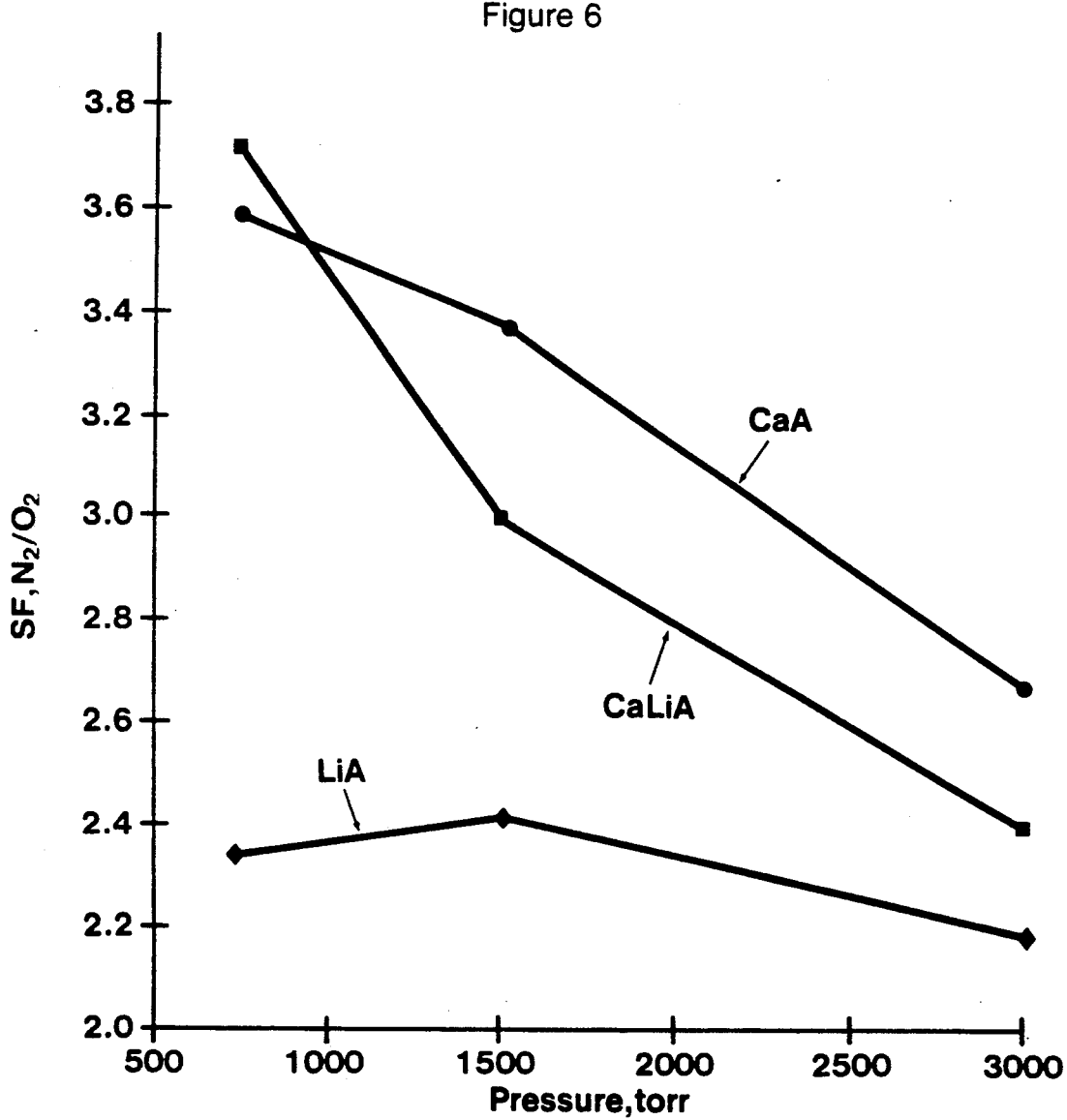
FIG. 6 shows the separation factors obtained in the experiments described in Example 2 below as a function of the adsorption pressure.

The LiA, CaA and LiCaA zeolites thus produced were all subjected to binary adsorption measurements in the same way as in Example 1. The resultant nitrogen isotherms are shown in FIG. 4 of the accompanying drawings, the oxygen isotherms in FIG. 5 and the separation factors in FIG. 6. From these Figures it will be seen that the LiCaA had higher nitrogen selectivity than either LiA or CaA at both 1500 and 3000 Torr. Although the nitrogen loading of LiCaA was somewhat less than that of CaA (but greater than that of LiA), LiCaA had higher nitrogen selectivity than CaA at high pressure and lower nitrogen selectivity than CaA at low pressure. It is desirable for an adsorbent in a PSA process to exhibit a high separation factor at the high adsorption pressure and a lower separation factor at the lower desorption pressure, since this produces a cleaner separation of the gas mixture. The LiCaA fulfills this desideratum well, and is thus a better PSA adsorbent than LiA or CaA zeolites.

TABLE 1

| Property | Material (anhydrous) | | | | |
|---|---|---|---|---|---|
| | LiA | LiSrA | SrA | LiCaA | CaA |
| $Al_2O_3$ (mmol/gm) | 2.7 | 2.8 | 2.7 | 3.3 | 3.1 |
| $SiO_2$ | 8.7 | 7.4 | 7.0 | 8.5 | 7.9 |
| $Li_2O$ | 2.6 | 0.55 | | 2.0 | |
| $Na_2O$ | 0.2 | 0.09 | 0.1 | 0.18 | 0.29 |
| CaO | | | | 0.9 | 2.9 |
| SrO | | 1.7 | 2.5 | | |
| Li/(Li + Ca) (equivalent ratio) | | | | 0.71 | |
| Li/(Li + Sr) (equivalent ratio) | | 0.24 | | | |

Example 3: Lithium/Calcium X Zeolites

Using the same techniques as in Example 1 above, except that a solution of calcium chloride was substituted for the strontium chloride solution and that the ratio of calcium to the ion-exchange capacity of the lithium zeolite was varied to vary the molar ratio of lithium to calcium in the final product, three lithium/calcium X zeolites with differing lithium/calcium molar ratios were prepared; all these materials had silica/alumina ratios of 2.0:1. For comparison purposes, simple lithium and calcium X zeolites were also prepared. All five materials were analyzed to determine their chemical compositions, and their thermal stabilities were measured by the differential thermal analysis (DTA) method described above. Also, the nitrogen and oxygen adsorption capacities of all five materials were measured at varying pressures. The results of the chemical analyses are given in Table 2 below, the results of the DTA tests in Table 3 and the results of the adsorption tests in Table 4.

TABLE 2

| Property | Material | | | | |
|---|---|---|---|---|---|
| | LiX 1 | 2 | 3 | 4 | CaX 5 |
| $Al_2O_3$ (mmols/g.) | 3.85 | 3.78 | 3.82 | 3.72 | 3.37 |
| $SiO_2$ (mmol/g.) | 8.09 | 8.19 | 7.9 | 7.7 | 7.54 |
| $Li_2O$ (mmoles/g.) | 3.81 | 3.27 | 2.35 | 1.64 | 0 |
| CaO (mmoles/g.) | 0 | 0.58 | 1.26 | 1.93 | 3.43 |
| Ca/(Li + Ca) (equivalent ratio) | 0 | 0.15 | 0.35 | 0.54 | 1.00 |

TABLE 3

| Property | Material | | | | |
|---|---|---|---|---|---|
| | LiX 1 | 2 | 3 | 4 | CaX 5 |
| Peak No. 1 (°C.) | 744 | 792 | 808 | 825 | 968 |
| Peak No. 2 (°C.) | 798 | 822 | 845 | 972 | 1067 |
| Peak No. 3 (°C.) | — | 962 | 955 | — | — |

TABLE 4

| Material 1 (LiX) | Nitrogen Adsorption | | | | | |
|---|---|---|---|---|---|---|
| Nitrogen pressure (psia) | 3.00 | 15.45 | 29.94 | 43.62 | 57.31 | 71.73 |
| Nitrogen capacity (mmoles/g) | 0.390 | 1.31 | 1.84 | 2.14 | 2.37 | 2.55 |
| Material 2 (LiCaX) | | | | | | |
| Nitrogen pressure (psia) | 3.67 | 15.08 | 29.33 | 43.50 | 58.04 | 71.73 |
| Nitrogen capacity (mmoles/g) | 0.541 | 1.34 | 1.84 | 2.15 | 2.39 | 2.57 |
| Material 3 (LiCaX) | | | | | | |
| Nitrogen pressure (psia) | 4.08 | 15.41 | 29.33 | 43.14 | 57.80 | 72.46 |
| Nitrogen capacity (mmoles/g) | 0.600 | 1.20 | 1.70 | 1.97 | 2.19 | 2.35 |
| Material 4 (LiCaX) | | | | | | |
| Nitrogen pressure (psia) | 3.89 | 15.34 | 29.33 | 43.50 | 57.43 | 72.10 |
| Nitrogen capacity (mmoles/g) | 0.665 | 1.34 | 1.71 | 1.94 | 2.12 | 2.26 |
| Material 5 (CaX) | | | | | | |
| Nitrogen pressure (psia) | 3.06 | 15.26 | 29.69 | 43.14 | 57.56 | 71.24 |
| Nitrogen capacity (mmoles/g) | 0.608 | 1.29 | 1.60 | 1.79 | 1.93 | 2.05 |
| | Oxygen Adsorption | | | | | |
| Material 1 (LiX) | | | | | | |
| Oxygen pressure (psia) | 2.99 | 14.71 | 29.60 | 43.50 | 57.80 | 71.98 |
| Oxygen capacity (mmoles/g) | 0.079 | 0.274 | 0.460 | 0.618 | 0.776 | 0.917 |
| $N_2/O_2$ Selectivity | 4.94 | 4.78 | 4.00 | 3.46 | 3.05 | 2.78 |
| Material 2 (LiCaX) | | | | | | |
| Oxygen pressure (psia) | 4.03 | 15.25 | 29.20 | 43.38 | 57.92 | 71.98 |
| Oxygen capacity (mmoles/g) | 0.109 | 0.328 | 0.520 | 0.698 | 0.877 | 1.02 |
| $N_2/O_2$ Selectivity | 4.96 | 4.08 | 3.54 | 3.08 | 2.72 | 2.52 |
| Material 3 (LiCaX) | | | | | | |
| Oxygen pressure (psia) | 4.00 | 15.45 | 29.45 | 43.38 | 58.17 | 71.98 |
| Oxygen capacity (mmoles/g) | 0.066 | 0.240 | 0.441 | 0.620 | 0.790 | 0.936 |
| $N_2/O_2$ Selectivity | 9.09 | 5.38 | 3.85 | 3.18 | 2.77 | 2.51 |
| Material 4 (LiCaX) | | | | | | |
| Oxygen pressure (psia) | 4.04 | 15.14 | 29.94 | 43.26 | 57.68 | 71.98 |
| Oxygen capacity (mmoles/g) | 0.127 | 0.349 | 0.580 | 0.758 | 0.920 | 1.07 |
| $N_2/O_2$ Selectivity | 5.24 | 3.84 | 2.95 | 2.56 | 2.30 | 2.11 |
| Material 5 (CaX) | | | | | | |
| Oxygen pressure (psia) | 4.20 | 15.39 | 29.57 | 43.14 | 57.68 | 71.98 |
| Oxygen capacity (mmoles/g) | 0.159 | 0.409 | 0.640 | 0.820 | 0.983 | 1.12 |
| $N_2/O_2$ Selectivity | 3.82 | 3.15 | 2.50 | 2.18 | 1.96 | 1.83 |

Figure 7:
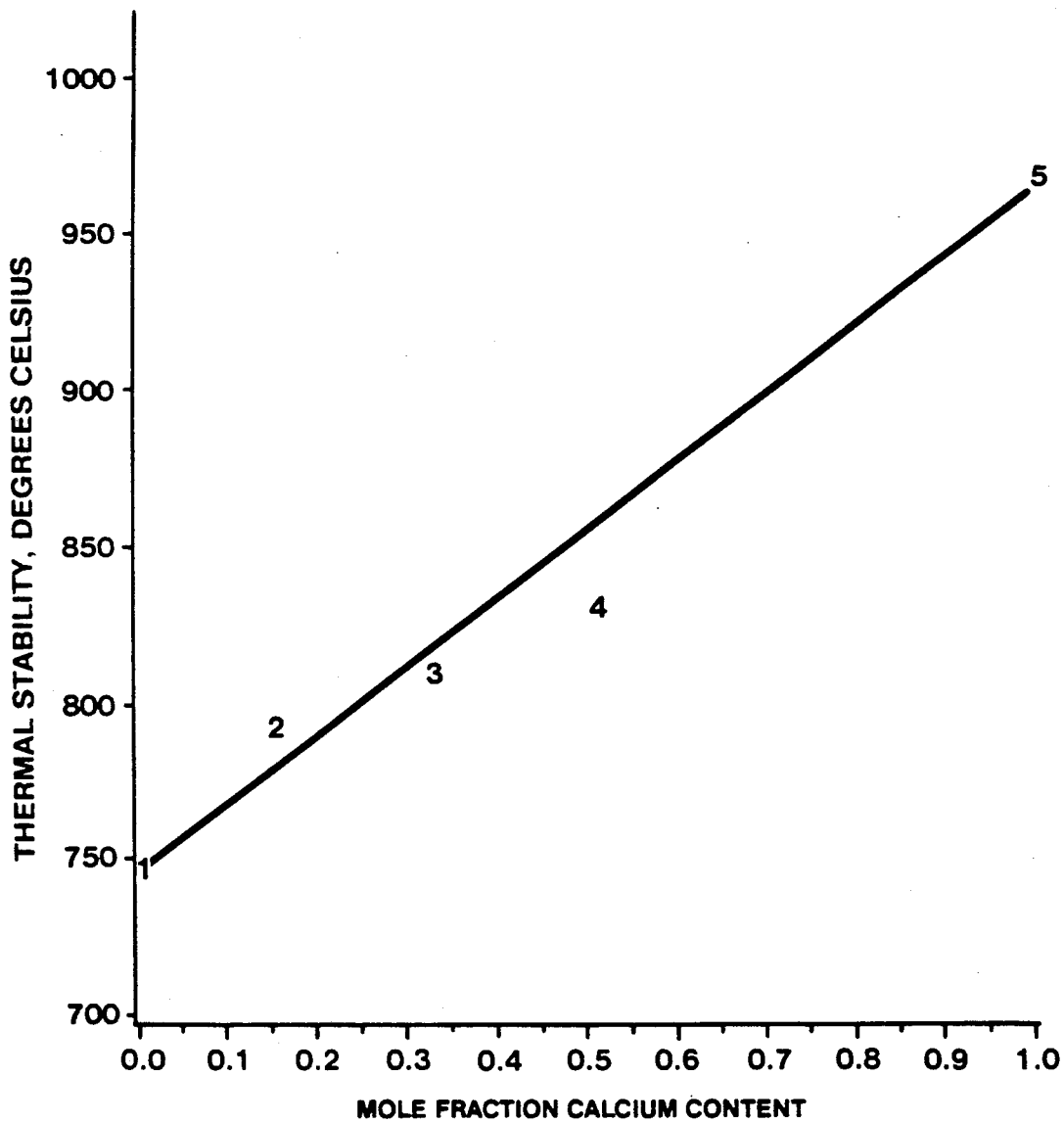
FIG. 7 shows the variation of the thermal stability of mixed lithium/calcium zeolites with mole fraction of calcium, as determined in the experiments described in Example 3 below.
Figure 8:
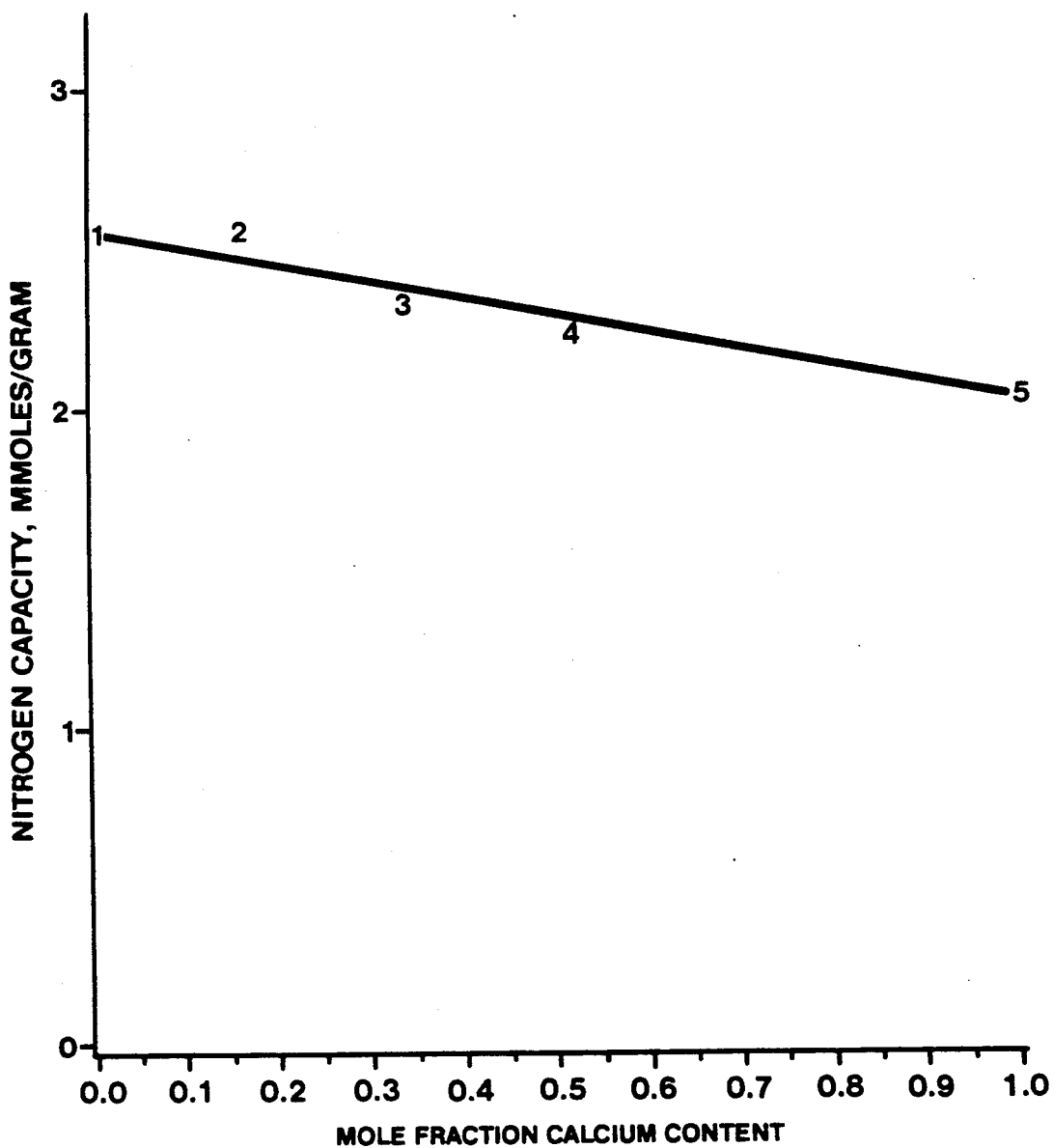
FIG. 8 shows the variation of the nitrogen adsorption capacity of mixed lithium/calcium zeolites with mole fraction of calcium, as determined in the experiments described in Example 3 below.

The thermal stability data for the No. 1 peak given in Table 3 are plotted against the equivalent fraction of calcium in the zeolite in FIG. 7. It will be seen that the thermal stability increases with increasing calcium content. Also, the nitrogen capacity values at 5 atmospheres pressure (obtained by intrapolation from the data in Table 4) ar plotted against the equivalent fraction of calcium in the zeolite in FIG. 8. It will be seen that the nitrogen capacity decreases with increasing calcium content. Reading FIGS. 7 and 8 together, it will be seen that the lithium/calcium X zeolites of the present invention, which have a calcium equivalent fraction of from about 50 to about 90 percent, combine high thermal stability with good adsorption, and are thus very suitable for use as PSA adsorbents.

Example 4: Lithium/Strontium X Zeolites

Using the same techniques as in Example 1 above, except that the ratio of strontium to the ion-exchange capacity of the lithium zeolite was varied to vary the molar ratio of lithium to strontium in the final product, three lithium/strontium X zeolites with differing lithium/strontium molar ratios were prepared. For comparison purposes, simple lithium and strontium X zeolites were also prepared. All five material were analyzed to determine their chemical compositions, and their thermal stabilities were measured by the differential thermal analysis (DTA) method described above. Also, the nitrogen and oxygen adsorption capacities of all five materials were measured at varying pressures. The results of the chemical analyses are given in Table 5 below, the results of the DTA tests in Table 6 and the results of the adsorption tests in Table 7.

TABLE 5

| | Material | | | | |
|---|---|---|---|---|---|
| | LiX | | | | SrX |
| Property | 1 | 2 | 3 | 4 | 5 |
| $Al_2O_3$ (mmoles/g.) | 3.85 | 3.74 | 3.46 | 3.32 | 2.91 |
| $SiO_2$ (mmoles/g.) | 8.09 | 7.84 | 7.44 | 6.91 | 6.52 |
| $Li_2O$ (mmoles/g.) | 3.82 | 3.29 | 1.87 | 1.42 | 0 |
| SrO (mmoles/g.) | 0 | 0.49 | 1.46 | 1.95 | 2.81 |
| Sr/(Li + Sr) (equivalent ratio) | 0 | 0.13 | 0.44 | 0.70 | 100 |

TABLE 6

| | Material | | | | |
|---|---|---|---|---|---|
| | LiX | | | | SrX |
| Property | 1 | 2 | 3 | 4 | 5 |
| Peak No. 1 (°C.) | 744 | 765 | 821 | 830 | 946 |
| Peak No. 2 (°C.) | 798 | 805 | 909 | 907 | 1070 |
| Peak No. 3 (°C.) | — | 830 | — | — | — |

TABLE 7

| | Nitrogen Adsorption | | | | | |
|---|---|---|---|---|---|---|
| Material 1 (LiX) | | | | | | |
| Nitrogen pressure (psia) | 3.00 | 15.45 | 29.94 | 43.62 | 57.31 | 71.73 |
| Nitrogen capacity (mmoles/g) | 0.390 | 1.31 | 1.84 | 2.14 | 2.37 | 2.55 |
| Material 2 (LiSrX) | | | | | | |
| Nitrogen pressure (psia) | 3.67 | 15.04 | 28.84 | 43.50 | 57.56 | 71.98 |
| Nitrogen capacity (mmoles/g) | 0.533 | 1.34 | 1.84 | 2.16 | 2.39 | 2.57 |
| Material 3 (LiSrX) | | | | | | |
| Nitrogen pressure (psia) | 3.74 | 15.13 | 29.45 | 43.75 | 57.80 | 72.10 |
| Nitrogen capacity (mmoles/g) | 0.456 | 1.17 | 1.64 | 1.92 | 2.13 | 2.30 |
| Material 4 (LiSrX) | | | | | | |
| Nitrogen pressure (psia) | 3.76 | 15.03 | 29.33 | 43.50 | 57.68 | 71.98 |
| Nitrogen capacity (mmoles/g) | 0.432 | 1.09 | 1.54 | 1.81 | 2.01 | 2.18 |
| Material 5 (SrX) | | | | | | |
| Nitrogen pressure (psia) | 3.01 | 15.61 | 30.18 | 43.26 | 57.43 | 72.10 |
| Nitrogen capacity (mmoles/g) | 0.335 | 1.08 | 1.51 | 1.74 | 1.93 | 2.08 |
| | Oxygen Adsorption | | | | | |
| Material 1 (LiX) | | | | | | |
| Oxygen pressure (psia) | 2.99 | 14.71 | 29.60 | 43.50 | 57.80 | 71.98 |
| Oxygen capacity (mmoles/g) | 0.079 | 0.274 | 0.460 | 0.618 | 0.776 | 0.917 |
| $N_2/O_2$ Selectivity | 4.94 | 4.78 | 4.00 | 3.46 | 3.05 | 2.78 |

TABLE 7-continued

| Material 2 (LiSrX) | | | | | | |
|---|---|---|---|---|---|---|
| Oxygen pressure (psia) | 3.83 | 15.40 | 29.45 | 43.50 | 57.31 | 71.85 |
| Oxygen capacity (mmoles/g) | 0.141 | 0.394 | 0.602 | 0.778 | 0.935 | 1.09 |
| $N_2/O_2$ Selectivity | 3.78 | 3.40 | 3.06 | 2.78 | 2.56 | 2.36 |
| Material 3 (LiSrX) | | | | | | |
| Oxygen pressure (psia) | 3.74 | 15.19 | 28.96 | 43.74 | 58.04 | 71.85 |
| Oxygen capacity (mmoles/g) | 0.062 | 0.242 | 0.455 | 0.642 | 0.810 | 0.960 |
| $N_2/O_2$ Selectivity | 7.35 | 4.83 | 3.60 | 2.99 | 2.63 | 2.39 |
| Material 4 (LiSrX) | | | | | | |
| Oxygen pressure (psia) | 3.82 | 15.38 | 29.20 | 43.62 | 58.04 | 72.10 |
| Oxygen capacity (mmoles/g) | 0.061 | 0.236 | 0.437 | 0.620 | 0.788 | 0.940 |
| $N_2/O_2$ Selectivity | 7.08 | 4.62 | 3.52 | 2.92 | 2.55 | 2.32 |
| Material 5 (SrX) | | | | | | |
| Oxygen pressure (psia) | 3.08 | 14.67 | 29.57 | 43.50 | 57.19 | 72.10 |
| Oxygen capacity (mmoles/g) | 0.051 | 0.240 | 0.465 | 0.651 | 0.811 | 0.973 |
| $N_2/O_2$ Selectivity | 6.57 | 4.50 | 3.25 | 2.67 | 2.38 | 2.14 |

Figure 9:
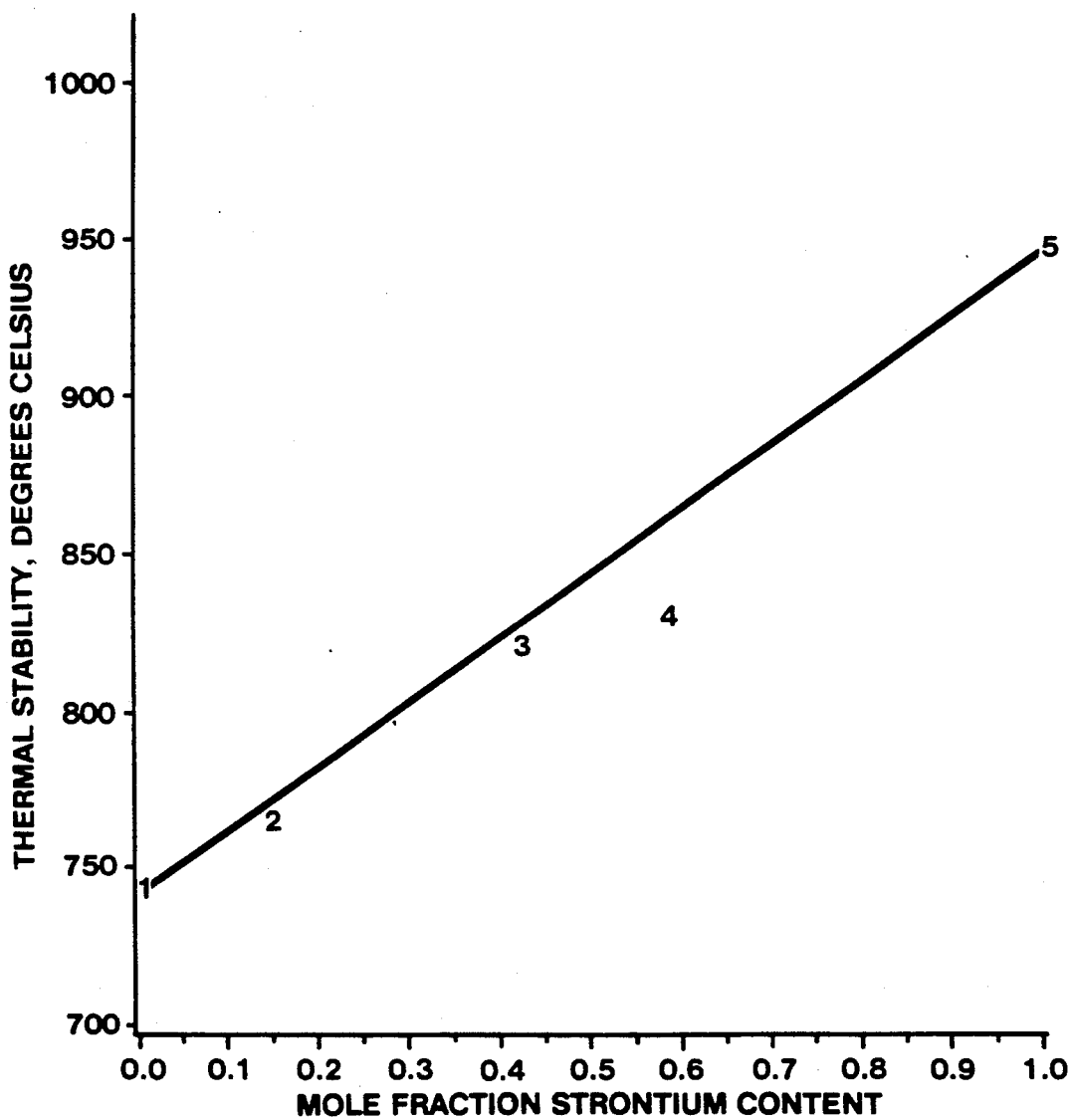
FIG. 9 shows the variation of the thermal stability of mixed lithium/strontium zeolites with mole fraction of strontium, as determined in the experiments described in Example 4 below.

The thermal stability data for the No. 1 peak given in Table 6 are plotted against the equivalent fraction of strontium in the zeolite in FIG. 9. It will be seen that the thermal stability increases with increasing strontium content. Also, the nitrogen capacity values at 5 atmospheres pressure (obtained by intrapolation from the data in Table 7 are plotted against the equivalent fraction of strontium in the zeolite in FIG. 10. It will be seen that the nitrogen capacity decreases with increasing strontium content. Reading FIGS. 9 and 10 together, it will be seen that the lithium/strontium X zeolites of the present invention, which have a strontium equivalent fraction of from about 50 to about 90 percent, combine high thermal stability with good adsorption, and are thus very suitable for use as PSA adsorbents.

We claim:

1. A lithium/alkaline earth metal X zeolite in which the silica:alumina ratio is from about 1.85 to about 3.0 and in which the lithium:alkaline earth metal equivalent ratio is from about 95:5 to about 50:50.

2. A zeolite according to claim 1 wherein the lithium:alkaline earth metal equivalent ratio is from about 90:10 to about 70:30.

3. A zeolite according to claim 2 wherein the alkaline earth metal is magnesium, calcium or strontium.

4. A zeolite according to claim 1 wherein not more than about 5 equivalent percent of the cations in the zeolite are sodium ions.

5. A lithium/alkaline earth metal A zeolite in which the silica:alumina ratio is from about 1.85 to about 4.0 and in which lithium:alkaline earth metal equivalent ratio is from about 10:90 to about 70:30.

6. A zeolite according to claim 5 wherein the lithium:alkaline earth metal equivalent ratio is from about 20:80 to about 50:50.

7. A zeolite according to claim 5 wherein the alkaline earth metal is magnesium, calcium or strontium.

8. A zeolite according to claim 5 wherein not more than about 5 equivalent percent of the cations in the zeolite are sodium ions.

9. A process for preparing a lithium/alkaline earth metal zeolite selected from the group consisting of X zeolites in which the lithium:alkaline earth metal equivalent ratio is from about 95:5 to about 50:50 and A zeolites in which the lithium:alkaline earth metal equivalent ratio is from about 10:90 to about 70:30, which process comprises:
   ion-exchanging an A or X zeolite, in a form having alkali metal cations other than lithium, with a solution of a lithium salt until at least about 90 mole percent of the original alkali metal cations have been replaced by lithium cations; and
   thereafter, ion-exchanging the lithium A or X zeolite thus produced with a solution of an alkaline earth metal salt until a sufficient proportion of the lithium cations have been replaced with alkaline earth metal cations to provide a lithium/alkaline earth metal equivalent ratio within the specified range.

10. A process according to claim 9 wherein the alkaline earth metal used comprises magnesium, calcium or strontium.

11. A process according to claim 9 wherein the lithium and the alkaline earth metal are present in the solutions in the form of their chlorides.

12. In a process for separating nitrogen from oxygen, which process comprises:
   contacting a gaseous feed mixture of nitrogen and oxygen with a molecular sieve under a first pressure, thereby causing nitrogen to be selectively adsorbed into the molecular sieve, and producing a gaseous first product mixture containing a greater proportion of oxygen than the feed mixture;
   separating the first product mixture from the molecular sieve; and
   reducing the pressure on the molecular sieve to a second pressure lower than the first pressure, thereby causing desorption from the molecular sieve of a gaseous second product mixture containing a greater proportion of nitrogen than the feed mixture,
   the improvement which comprises using as the molecular sieve a molecular sieve comprising a lithium/alkaline earth metal zeolite selected from the group consisting of X zeolites in which the lithium:alkaline earth metal equivalent ratio is from about 95:5 to about 50:50 and A zeolites in which the lithium:alkaline earth metal equivalent ratio is from about 10:9 to about 70:30.

13. A process according to claim 12 wherein the zeolite is an X zeolite.

14. A process according to claim 13 wherein the zeolite has a lithium:alkaline earth metal equivalent ratio of from about 85:15 to about 70:30.

15. A process according to claim 13 wherein the alkaline earth metal in the zeolite is magnesium, calcium or strontium.

16. A process according to claim 12 wherein the zeolite is an A zeolite.

17. A process according to claim 16 wherein the zeolite has a lithium:alkaline earth metal equivalent ratio is from about 20:80 to about 50:50.

18. A process according to claim 16 wherein the alkaline earth metal in the zeolite is magnesium, calcium or strontium.

19. A process according to claim 12 wherein not more than about 5 equivalent percent of the cations in the zeolite are sodium ions.

20. A process according to claim 12 wherein the first pressure is in the range of from about 1 to about 10 atmospheres.

21. A process according to claim 12 wherein the second pressure is in the range of about 0 to about 2 atmospheres.

22. A process according to claim 12 which is conducted at a temperature in the range of from −15° to +60° C.

* * * * *